May 2, 1944.　　　　S. E. CROSS　　　　2,347,937
VEHICLE SIGNAL
Filed Oct. 24, 1941
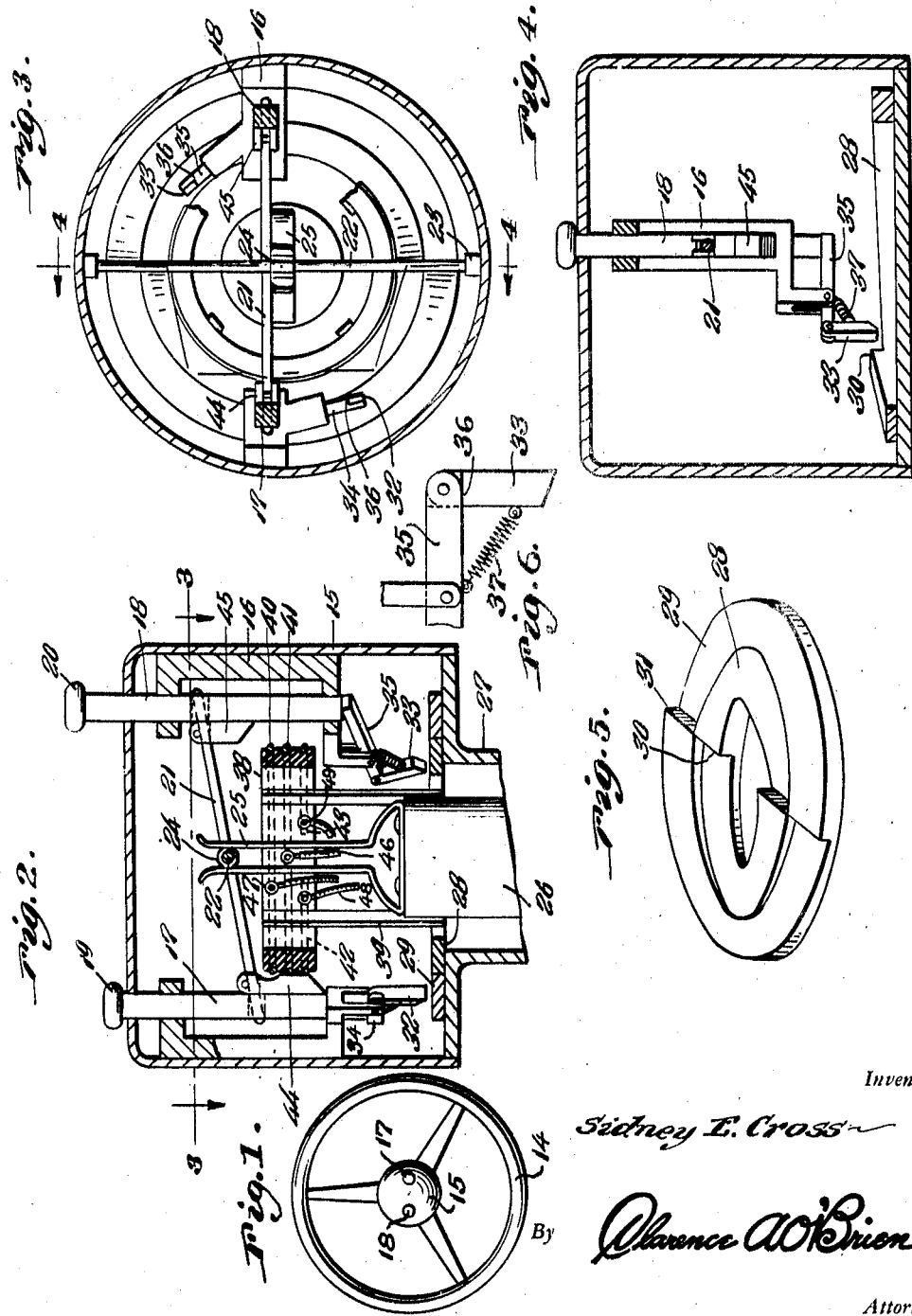
Inventor
Sidney E. Cross
By Clarence A. O'Brien
Attorney Patented May 2, 1944

2,347,937

UNITED STATES PATENT OFFICE 2,347,937

VEHICLE SIGNAL

Sidney E. Cross, San Antonio, Tex.

Application October 24, 1941, Serial No. 416,402

7 Claims. (Cl. 200—59)

The present invention relates to new and useful improvements in vehicle signal devices and has for its primary object to provide a signalling system having direction signal lamps interposed therein together with a manually operated switch on the steering wheel of a vehicle in order that the driver may indicate the direction in which he intends to turn.

A still further object is to provide a vehicle signal of simple and practical construction, which is efficient and reliable in performance and otherwise well adapted for the purposes for which the same is intended.

Further objects and advantages reside in the details of construction and operation as more fully hereinafter described and claimed, reference being had to the accompanying drawing forming a part hereof, wherein like numerals refer to like parts throughout, and in which:

Figure 1 is a detail of an automobile steering wheel showing the switch for the signal thereon, Figure 2 is a vertical sectional view of the steering wheel switch, Figure 3 is a sectional view taken on the line 3—3 of Figure 2, Figure 4 is a detail of one of the plungers for the steering wheel switch, Figure 5 is a perspective view of the cam ring for returning the plunger to normal position, and Figure 6 is a detail of one of the pivoted dogs for actuating the plungers.

The steering wheel 14 is provided with a switch housing 15 having a pair of guide brackets 16 therein for slidably receiving right and left plungers 17 and 18 formed of insulation material and having heads 19 and 20 projecting upwardly from the top of the housing. The plungers are pivoted at the respective ends of an arm 21 which is secured transversely of a bar 22 having its ends journaled in bearings 23—23 secured to the inside of the housing.

A polygonal collar 24 is secured on the bar 22 which is frictionally engaged between a pair of upstanding spring fingers 25 secured to the top of the steering post 26 for movement of the housing 15 and plungers 17 and 18 with the steering post.

The housing for the steering post is designated at 27 on the upper end of which is secured a pair of cam rings, including an inner cam ring 28 and an outer cam ring 29 each having a plurality of cam shoulders 30 and 31 oppositely disposed.

Pivoted dogs 32 and 33 extend downwardly from the ends of levers 34 and 35 which are pivoted to the respective plungers 17 and 18, while the other ends of the levers are positioned under the lower ends of the plungers. The dogs are supported with their free ends extending downwardly in the path of the shoulders 30 and 31 of the cams and slide freely over the cams when the latter move in one direction.

A stop 36 on the lever limits swinging movement of the dogs when the shoulders engage the dogs upon rotation of the cams in an opposite direction and cause the levers 34 and 35 to raise the respective plungers. Springs 37 yieldably maintain the dogs in their vertical positions.

An insulation ring 38 is supported on legs 39 rising from the inner cam ring 28, the periphery of the insulation ring having an upper conductor ring 40, an intermediate conductor ring 41, and lower conductor ring sections 42 and 43 partly embedded therein.

Contacts 44 and 45 are carried by the plungers 17 and 18 adapted to bridge the intermediate conductor ring and the upper ring when the plungers are partially depressed and adapted to bridge the intermediate conductor ring and the lower ring sections, when the plungers are fully depressed.

A circuit wire 46 leads from the conductor ring 41 to the ignition switch (not shown) of the automobile, while a circuit wire 47 leads from the upper conductor ring 40 to brake controlled front and rear signal lamps (not shown), and circuit wires 48 and 49 lead from the lower conductors 42 and 43, respectively, to front and rear direction signals (not shown).

In the operation of the device, when the plungers are both in their normal positions, the contacts 44 and 45 bridge the intermediate conductor ring 41 and the upper conductor ring 40 to which the brake-actuated switch is connected.

When the driver intends to make a right turn, the plunger 17 is depressed breaking contact with the upper conductor ring 40 and bridging the intermediate conductor ring 41 and lower conductor ring section 43 to thus energize the lamps 66 and 67 of the right direction signal. At the same time the left plunger 18 is raised out of contacting engagement.

During the turning movement of the steering wheel to make the right turn, the dog 32 of the plunger 17 will ride over the cam ring 28 and when the turn is completed and the steering wheel returned to its original position, the dog will strike the stationary shoulders of the cam ring 28 causing the plungers to return to their original positions.

A similar action will occur with respect to the left direction signal when the left plunger 18 is depressed.

What is claimed is:

1. A manually operable switch for controlling a pair of circuits of a vehicle signaling system, said switch comprising a pair of reciprocating contacts adapted to be carried by a vehicle steering wheel for rotation therewith, stationary conductor rings in said circuits for engagement by the contacts upon opposite movement thereof, and a stationary member engaging the contacts upon a predetermined movement of the steering wheel to move the contacts in one direction.

2. A manually operable switch for controlling a pair of circuits of a vehicle signaling system, said switch comprising a pair of reciprocating contacts adapted to be carried by a vehicle steering wheel for rotation therewith, stationary conductor rings in said circuits for engagement by the contacts upon opposite movement thereof, said contacts being manually movable in one direction, and a stationary member engaging the contacts for moving the latter in an opposite direction upon a predetermined movement of the steering wheel.

3. A manually operable switch for controlling a pair of circuits of a vehicle signaling system, said switch comprising a pair of reciprocable plungers carried by a vehicle steering wheel for rotation as a unit therewith and manually operable in one direction, means connecting the plungers for opposite movement, stationary conductor rings in the circuits, contacts carried by the plungers for engaging the respective conductor rings, actuating means carried by each plunger, and stationary means in the path of the actuating means for moving the plungers in an opposite direction upon a predetermined movement of the steering wheel.

4. A manually operable switch for controlling a pair of circuits of a vehicle signaling system, said switch comprising a pair of reciprocable plungers carried by a vehicle steering wheel for rotation as a unit therewith and manually operable in one direction, means connecting the plungers for opposite movement, stationary conductor rings in the circuits, contacts carried by the plungers for engaging the respective conductor rings, pivoted dogs carried by the steering wheel in the path of movement of each plunger, and stationary concentrically arranged cam rings having shoulders thereon in the path of the dogs for engaging and actuating the dogs to move the plungers in an opposite direction upon a predetermined movement of the steering wheel.

5. A manually operable switch for controlling a pair of circuits of a vehicle signaling system, said switch comprising a pair of reciprocable plungers adapted to be carried by a vehicle steering wheel for rotation as a unit therewith and manually operable in one direction, means connecting the plungers for opposite movement and comprising a pair of spring fingers rising from the steering post of the vehicle and a rocker arm frictionally and pivotally mounted between the fingers and connected to the plungers, a plurality of spaced axially aligned conductor rings in the circuits, contacts carried by the plungers for bridging pairs of the rings to close the circuits, pivoted dogs carried by the steering wheel in the path of movement of each plunger, and stationary cam rings having shoulders thereon in the path of the dogs for engaging and actuating the dogs to move the plungers in an opposite direction upon a predetermined movement of the steering wheel.

6. A vehicle signal switch comprising a pair of plungers reciprocably mounted on the steering wheel of the vehicle for rotation as a unit therewith and manually operable in one direction, means connecting the plungers for opposite movement of one plunger upon a predetermined movement of the other plunger, said means comprising a pair of spring fingers rising from the steering post of the vehicle and a rocker arm frictionally and pivotally mounted between the fingers and connected to the plungers, a plurality of spaced apart axially aligned conductor rings, contacts carried by the plungers adapted to bridge a pair of the rings for closing a circuit connected therewith, actuating means carried by the steering wheel in the path of movement of each plunger, and stationary means in the path of the actuating means for moving the plungers in an opposite direction upon a predetermined movement of the steering wheel.

7. A vehicle signal switch comprising a pair of plungers reciprocably mounted on the steering wheel of the vehicle for rotation as a unit therewith and manually operable in one direction, means connecting the plungers for opposite movement of one plunger upon a predetermined movement of the other plunger, said means comprising a pair of spring fingers rising from the steering post of the vehicle and a rocker arm frictionally and pivotally mounted between the fingers and connected to the plungers, a plurality of spaced apart axially aligned conductor rings, contacts carried by the plungers adapted to bridge a pair of the rings for closing a circuit connected therewith, pivoted dogs carried by the steering wheel in the path of movement of each plunger, and stationary cam rings having shoulders thereon in the path of the dogs for engaging and actuating the dogs to move the plungers in an opposite direction upon a predetermined movement of the steering wheel.

SIDNEY E. CROSS.